April 19, 1960     B. E. LENEHAN ET AL     2,933,686
ELECTRICAL MEASURING INSTRUMENT Filed Oct. 29, 1956     4 Sheets-Sheet 1

April 19, 1960  B. E. LENEHAN ET AL  2,933,686
ELECTRICAL MEASURING INSTRUMENT
Filed Oct. 29, 1956  4 Sheets-Sheet 2

WITNESSES
Edwin E. Bassler
Wm. L. Groome

INVENTORS
Veron S. Thomander &
Bernard E. Lenehan
BY
David M. Schiller
ATTORNEY

United States Patent Office 2,933,686
Patented Apr. 19, 1960

2,933,686

ELECTRICAL MEASURING INSTRUMENT

Bernard E. Lenehan, Bloomfield, and Veron S. Thomander, Maplewood, N.J., assignors to Westinghouse Electric Corporation, East Pittsburgh, Pa., a corporation of Pennsylvania Application October 29, 1956, Serial No. 619,051

1 Claim. (Cl. 324—147)

This invention relates to electrical measuring instruments and has particular relation to electrical measuring instruments of the moving iron type.

A moving iron instrument includes a winding for producing a magnetic field. A plurality of magnetic elements usually formed of soft iron are disposed in the magnetic field produced by current flowing in the winding. When these magnetic elements are magnetized they develop attraction or repulsion forces therebetween. One of the magnetic elements is positioned for rotation with respect to the remainder of the magnetic elements under the influence of these forces.

Among the problems presented in the design of a moving iron instrument is the provision of a closely coupled magnetic circuit for magnetic flux produced by current flowing in the winding. A closely coupled magnetic circuit is highly desirable in that it increases the sensitivity of the instrument to energizing quantities. Another problem is the provision of adequate shielding of the instrument against stray magnetic fields which may adversely affect the operation of the instrument. Further problems in the design of such instruments involve the manner of assembling the parts of the instrument to provide a compact, efficient and rigidly constructed instrument.

In the present invention a moving iron instrument is provided which includes a winding effective when energized for producing a magnetic field. The winding is carried by a tubular support to surround a central cavity of the support. One or more fixed magnetic elements of cylindrical configuration are positioned within the opening of the support in the path of the magnetic field. A moving magnetic element is positioned adjacent the fixed magnetic elements for rotation relative to the fixed elements about the axis of the fixed elements. The magnetization of the fixed and moving elements by the magnetic field results in the establishment of forces therebetween which tend to rotate the moving element in a predetermined direction about the axis.

In order to improve the efficiency of the instrument the invention provides a pair of magnetic members preferably of cup-shaped configuration which are mounted by the support adjacent the fixed magnetic elements with flanges of the cup-shaped members located within recesses of the ends of the support. In order to provide effective shielding of the instrument against stray magnetic fields the invention further provides a continuous magnetic shield which is positioned to surround the support and the winding carried thereby. With the magnetic shield and the cup-shaped members in operative positions, portions of the support extend between the shield and cup-shaped members to effect a uniform spacing between the shield and cup-shaped members. The shield and cup-shaped members are further positioned with respect to each other such that the shield and flanges of the cup-shaped members overlap to provide a closely coupled magnetic circuit.

The instrument further includes a pair of frame members which are arranged to mount the support together with the cup-shaped members and magnetic shield. The frame members are arranged such that a concentric mounting of the support with respect to the axis of rotation of the moving element is assured. These frame members also carry bearing means for supporting the moving element for rotation.

It is, therefore, an object of the invention to provide an improved electrical instrument of the moving iron type.

It is a further object of the invention to provide a moving iron electrical instrument having an improved arrangement of the operating parts of the instrument.

It is a still further object of the invention to provide a moving iron electrical instrument having a magnetic circuit of improved arrangement.

It is another object of the invention to provide a moving iron instrument with an improved magnetic shielding arrangement for shielding the instrument against stray magnetic fields.

Other objects of the invention will be apparent from the following description taken in conjunction with the accompanying drawings, in which.

Figure 1:
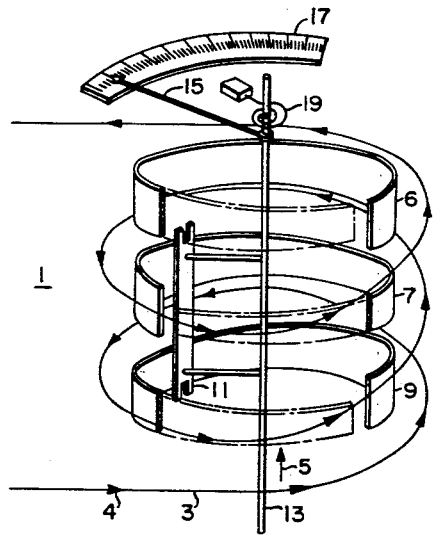
Figure 1 is a schematic view in perspective illustrating a moving iron electrical instrument.

Referring to the drawings there is schematically illustrated in Fig. 1 portions of an electrical instrument of the moving iron type constructed in accordance with the invention. The instrument of Fig. 1 is represented generally by the numeral 1 and has a stator assembly which includes an electroconductive winding 3 having an axial opening. When the winding 3 is energized by current flowing therethrough a magnetic field is established in the opening of the winding. For example, when current flows in the winding 3 in the direction of the arrow 4 a magnetic flux is established which flows through the opening of the winding in the direction of the arrow 5. The winding 3 may be energized by either alternating or direct current. If the winding is energized by alternating current the arrow 4 represents an instantaneous direction of flow.

The instrument further includes a plurality of fixed magnetic elements 6, 7, and 9 which are constructed of a suitable magnetic material such as soft iron. These fixed magnetic elements are of cylindrical configuration with each having an axial dimension which varies from a predetermined value at one end thereof to a smaller value at the opposite end thereof. The element 7 is observed to be positioned between the elements 6 and 9 in reversed relation with respect to the elements 6 and 9 such that the wide end of the element 7 is adjacent the narrow ends of the elements 6 and 9. It is noted that these fixed elements are positioned within the opening of the winding 3 so as to be in the path of magnetic flux produced by current flowing in the winding 3.

When the winding 3 is energized magnetic flux produced by the winding traverses the fixed magnetic elements to induce magnetic poles therein. For the direction of current in the winding 3 as represented by the arrow 4 magnetic poles are induced in the fixed elements having polarities as shown in Fig. 1. As viewed in Fig. 1 the upper portions of the fixed elements have north magnetic poles induced therein whereas the lower portions of the fixed elements have south magnetic poles induced therein.

The instrument 1 further includes a rotor assembly which comprises a moving magnetic element 11 which may be constructed of soft iron in the manner of the fixed magnetic elements. The moving element 11 is positioned within the opening of the winding 3 adjacent the fixed elements. It is noted that for magnetic flux flowing through the opening of the winding in the direction of the arrow 5 the upper end of the element 11 as viewed in Fig. 1 has induced therein a north magnetic pole with the lower end of the moving element having induced therein a south magnetic pole. With this arrangement the moving element 11 will be repulsed by the fixed element 7 in a clockwise direction as viewed in Fig. 1. In addition, the moving element will be attracted by the fixed elements 6 and 9 in a clockwise direction. By reason of the tapered construction of the fixed elements the repulsion forces between the elements 7 and 11 will decrease as the element 11 moves in the clockwise direction whereas the attraction forces between the elements 6, 9 and 11 will increase as the element 11 moves in the clockwise direction. Such tapered construction of the fixed elements provides a substantially linear response of the instrument.

The moving element 11 is conveniently mounted for rotation relative to the fixed elements 6, 7 and 9 about an axis by means of a shaft 13. The shaft 13 has affixed thereto a suitable pointer 15 which traverses a suitably calibrated scale 17 in response to energization of the winding 3. A suitable coil spring 19 is secured between the shaft 13 and the stator assembly to oppose rotation of the shaft.

Figure 2:
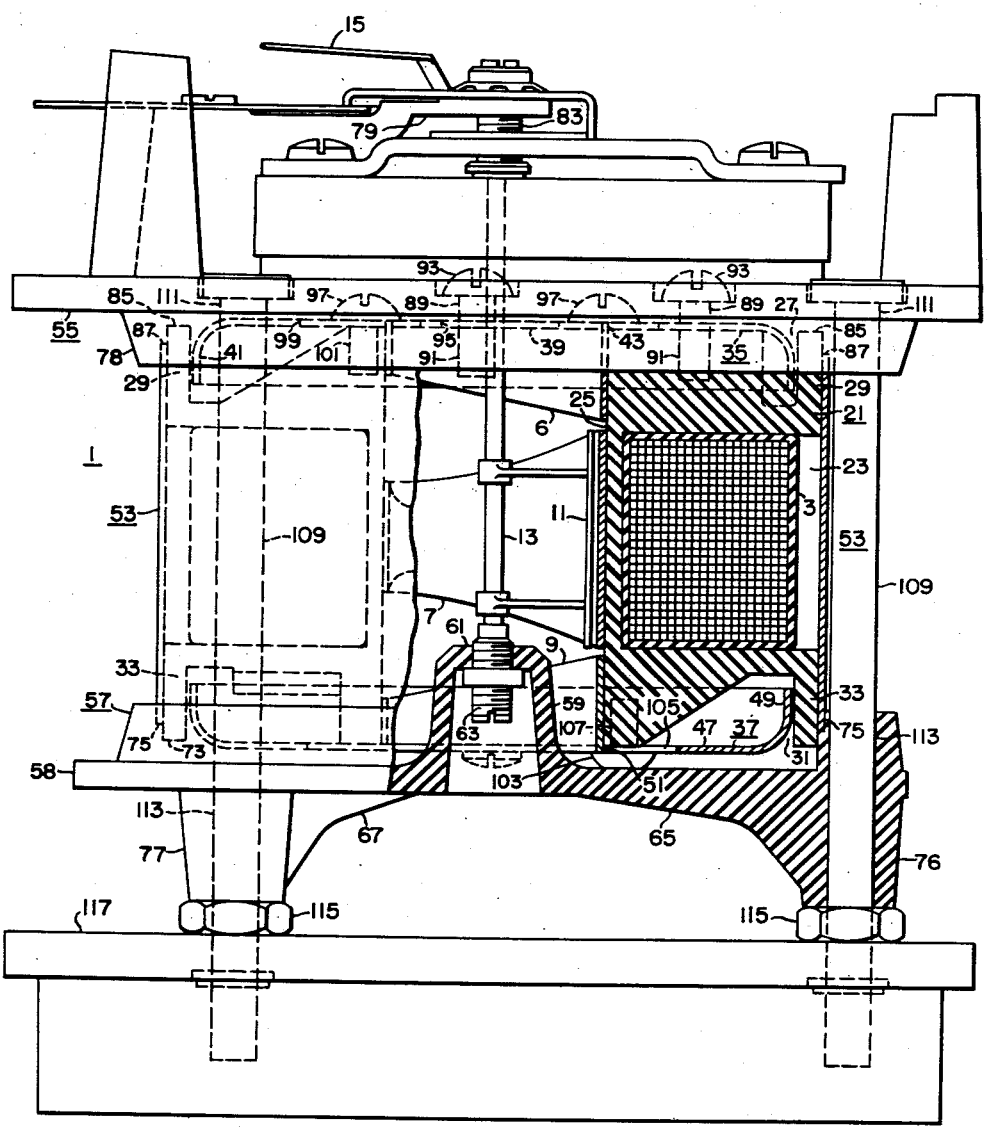
Fig. 2 is a view in elevation with parts shown in section illustrating details of construction of the instrument of Fig. 1.
Figure 5:
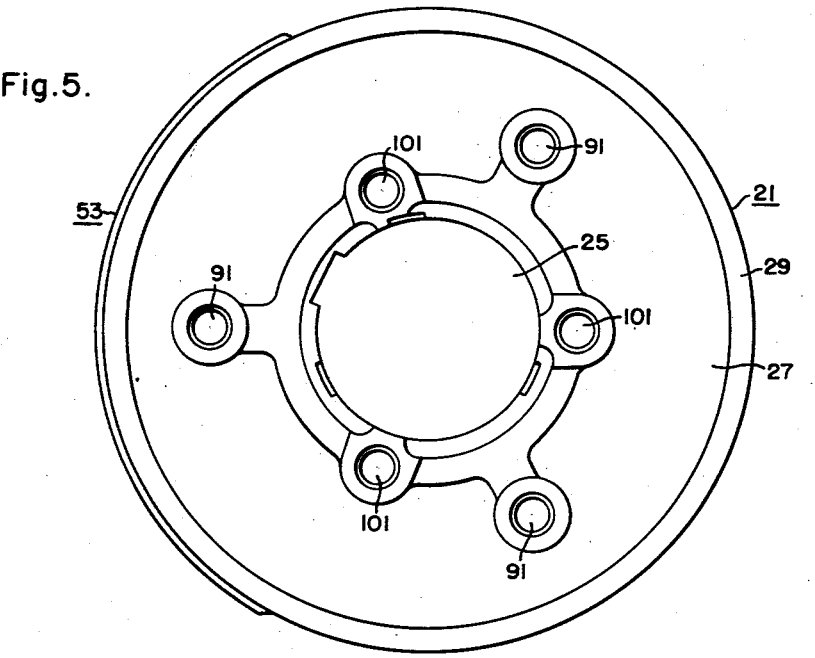
Fig. 5 is a view in top plan of a support and additional magnetic part of the instrument of Fig. 2 with parts broken away.

Referring now to Fig. 2 there is illustrated the instrument 1 constructed in accordance with the teachings of the present invention. As there shown, a suitable support 21 is provided for supporting certain of the operating parts of the instrument 1. The support 21 is preferably constructed of a suitable electrical insulating material. As shown in Figs. 2 and 5, the support 21 is of tubular configuration including an annular recess 23 of the side wall of the support proportioned to receive the winding 3. The support 21 further includes a central cavity 25 which extends entirely therethrough to open at the ends of the support. The cavity 25 is shown in Fig. 5 as being of circular configuration. The upper end of the support 21 as viewed in Fig. 2 is formed with a recess 27 which defines an annular peripheral wall portion 29 of the support. In a similar manner the lower end of the support 21 as viewed in Fig. 2 is provided with a recess 31 to define an annular peripheral wall portion 33 of the support.

In order to improve the efficiency of the instrument 1 a pair of similar magnetic members 35 and 37 are positioned respectively adjacent the upper end and lower ends of the support 21 as viewed in Fig. 2. The members 35 and 37 may be formed of any suitable magnetic material and are illustrated as being of cup-shaped configuration. Since the members 35 and 37 are of similar construction only the member 35 is shown in detail. The member 35 is illustrated in detail in Fig. 3 as comprising a flat base portion 39 having an annular flange 41. The base portion 39 includes a central opening 43 with a diameter substantially equal to the diameter of the cavity 25 of the support 21. A plurality of portions 45 are struck down from the base portion 39 to extend through the opening 43. As shown in Fig. 2 the member 37 similarly includes a base portion 47 with a flange 49 and an opening 51 of the base portion with portions (not shown) of the base portion struck down to extend through the opening 51.

According to the present invention the members 35 and 37 are mounted by the support 21 in the manner illustrated in Fig. 2. As there shown, the member 35 is positioned with the flange 41 within the recess 27 of the support 21 in engagement with the annular wall 29. With this arrangement the base portion 39 engages the upper end surface of the support 21 with the opening 43 aligned with the cavity 25 to have the flange 41 projecting in a downward direction as viewed in Fig. 2. In a similar manner, the member 37 is positioned with the flange 49 within the recess 31 of the support 21 in engagement with the wall 33. The base portion 47 engages the lower end surface of the support as viewed in Fig. 2 with the opening 51 in alignment with the cavity 25 to have the flange 49 projecting toward the flange 41 of the member 35.

Figure 3:
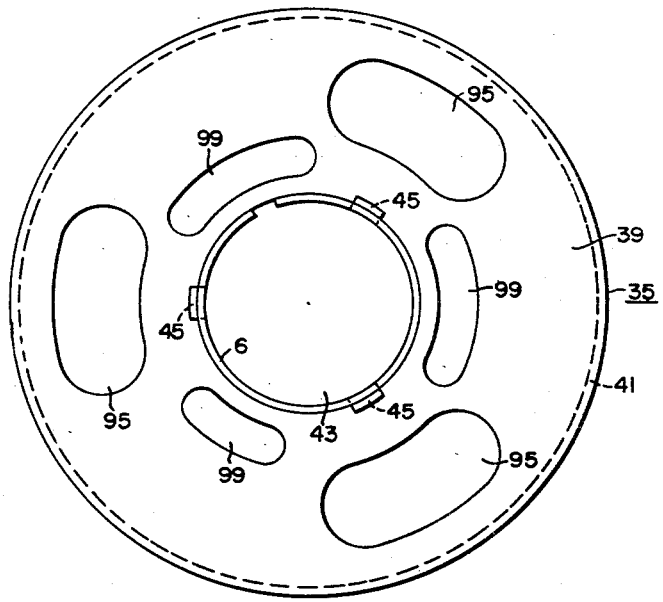
Fig. 3 is a view in cross-section of a magnetic member of the instrument of Fig. 2.
Figure 4:
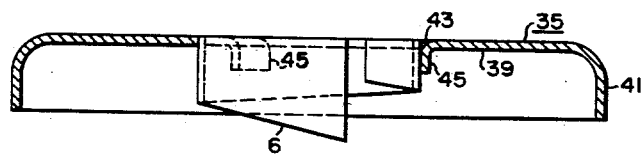
Fig. 4 is a view in top plan of the member of Fig. 3.

The elements 6 and 9 may be mounted within the cavity 25 of the support 21 in any suitable manner. In order to permit adjustment of the elements 6 and 9 about the axis of the shaft 13 to provide a desired scale distribution the elements 6 and 9 are conveniently supported within the cavity 25 by means of the magnetic members 35 and 37. For this purpose, the element 6 is positioned within the opening 43 of the member 35 as shown in Fig. 3 such that the struck down portions 45 engage the outer surface of the element 6. The element 6 may be secured in this position in any suitable manner such as by solder or cement which may be positioned between the element 6 and the portions 45. The element 6 may be welded to the member 35 if desired. The element 9 may be secured to the member 37 in a similar manner. With this arrangement adjustment of the elements 6 and 9 is conveniently effected by adjusting the members 35 and 37 about the axis of the shaft 13. Such adjustment of the members 35 and 37 may be accomplished in any suitable manner.

In order to provide effective shielding for the instrument 1 against stray magnetic fields the present invention provides a magnetic shield 53 having the configuration illustrated in Figs. 2 and 5. As there shown, the shield 53 is of tubular construction having a continuous peripheral wall. The shield 53 may be constructed of any suitable material such as soft iron. The shield 53 is positioned as shown in Figs. 2 and 5 to surround the support 21 in engagement with the side wall of the support. The shield may be secured to the support in an operative position in any suitable manner. It is observed with reference to Fig. 2 that the axial length of the shield is selected such that the shield 53 surrounds the winding 3, the magnetic elements 6, 7, 9 and 11 and the flanges 41 and 49 of the magnetic members 35 and 37. The axial length of the shield is slightly less than the overall axial length of the support 21.

With the arrangement described the wall 29 of the support 21 extends between and engages the shield 53 and the flange 41 of the member 35. In a similar manner, the wall 33 extends between and engages the shield 53 and the flange 49 of the member 37. This arrangement provides a uniform spacing of the shield 53 and the members 35 and 37 in directions transverse to the shaft 13 for each instrument regardless of variations in dimensions of the parts. It is further noted that the shield 53 extends beyond the edges of the flanges 41 and 49 so as to overlap these flanges in a direction parallel to the direction of extension of the shaft 13. This construction provides a closely coupled magnetic circuit for the instrument 1 to thereby provide an instrument of improved sensitivity to energizing quantities.

Figure 7:
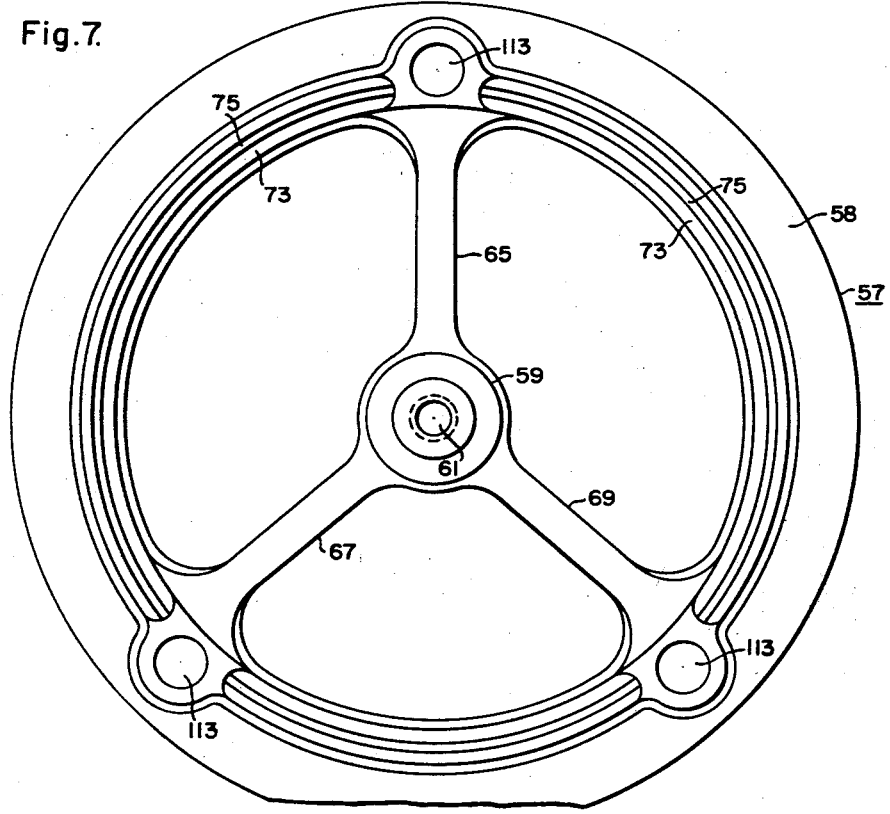
Fig. 7 is a view in top plan of another frame member of the instrument of Fig. 2.

In order to support the previously described parts of the instrument in operative positions the invention provides a frame assembly which may include a pair of frame members 55 and 57 which are positioned respectively at the upper and lower ends of the support 21 as viewed in Fig. 2. Details of construction of the frame member 57 are best shown in Fig. 7. As there shown the member 57 comprises a base portion 58 including a central projection 59 having a threaded opening 61 proportioned to receive a suitable threaded bearing screw 63 shown in Fig. 2. The projection 59 is connected to the base portion 58 by a plurality of spaced connecting parts 65, 67 and 69. The base portion 58 of the member 57 is provided with a pair of annular stepped grooves 73 and 75 which are arranged concentrically with respect to the opening 61. The grooves 73 and 75 are provided for the purpose of receiving respectively end portions of the wall 33 of the support 21 and the shield 53. This arrangement assures a concentric mounting of the support 21 and the shield 53 with respect to the shaft 13. Each of the connecting parts 65, 67 and 69 includes an integral leg portion with the leg portions 76 and 77 of the connecting parts 65 and 67 respectively being illustrated in Fig. 2. When the member 57 is operatively positioned with respect to the support and its associated parts the projection 59 extends through the opening 51 of the member 37 into the cavity 25 of the support.

Figure 6:
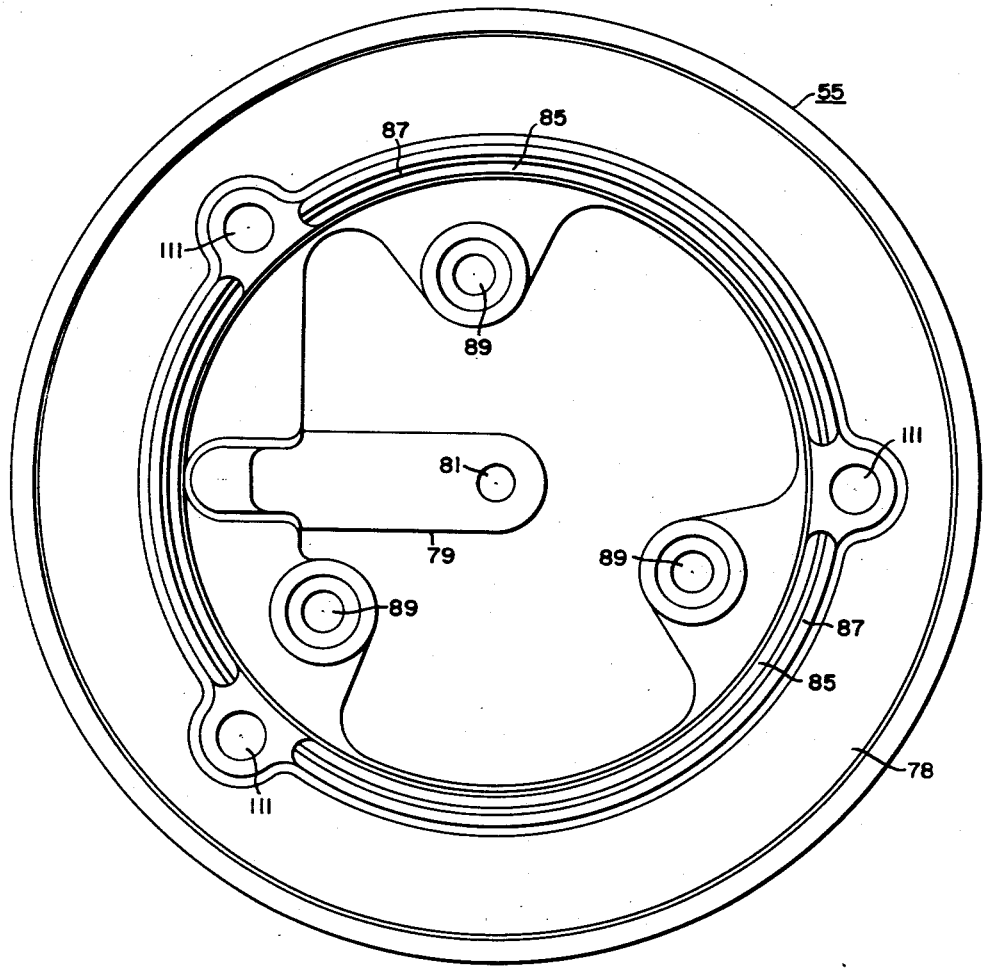
Fig. 6 is a view in bottom plan of a frame member of the instrument of Fig. 2.

As best shown in Fig. 6 the frame member 55 includes a base portion 78 with a projection 79 extending therefrom having a threaded opening 81 proportioned for receiving a suitable threaded bearing screw 83 shown in Fig. 2. In order to mount the support 21 and the shield 53 the base portion 78 of the member 55 is formed with a pair of stepped annular grooves 85 and 87 for receiving respectively end portions of the wall 29 of the support 21 and the shield 53. The grooves 85 and 87 are spaced from the opening 81 of the member 55 by the same distance by which the grooves 73 and 75 are spaced from the opening 61 of the member 57. The grooves 85 and 87 are further positioned concentrically with respect to the opening 81. This arrangement assures a concentric mounting of the support 21 and its associated parts by the frame members with respect to the shaft 13 which is also supported by the frame members.

In order to permit securement of the support 21 to the frame member 55 the member 55 includes a plurality of projections of the base portion 78 each having a threaded opening 89 as shown in Fig. 6. These openings 89 are positioned in alignment with suitable threaded openings 91 of the adjacent end surface of the support 21 when the support 21 and member 55 are operably positioned with respect to each other. In order to secure the support 21 to the member 55 suitable screws 93 may be passed through the aligned openings 89 and 91. The screws 93 pass through suitable openings 95 of the base portion 39 of the magnetic member 35 shown in Fig. 3. The openings 95 are somewhat elongated to permit limited adjustment of the member 35 about the shaft 13 in the manner previously described without interference from the screws 93.

In order to secure the cup-shaped member 35 to the support 21 suitable screws 97 are passed through openings 99 of the base portion 39 of the member 35 into suitably threaded openings 101 of the adjacent end surface of the support 21. The openings 99 of the member 35 are elongated to permit adjustment of the member 35 about the shaft 13. The cup-shaped member 37 is similarly secured to the support 21 by passing screws 103 through openings 105 and 107 which are formed respectively in the base portion 47 of the member 37 and in the adjacent end surface of the support 21.

In order to provide a rigid structure the frame members 55 and 57 are secured together in the manner illustrated in Fig. 2. As there shown a plurality of studs 109 are passed through openings 111 of the frame member 55 and openings 113 of the leg portions of the frame member 57. Suitable nuts 115 engage the threaded ends of the studs 109 to effect the securing action. The studs 109 may extend into a suitable base member 117.

Although the invention has been described with reference to certain specific embodiments thereof numerous modifications are possible and it is intended to cover all modifications falling within the spirit and scope of the invention.

We claim as our invention:

In an electrical instrument, an insulating support having opposite end walls and a cavity extending completely through said support and opening through both of said end walls, each of said end walls having an annular peripheral wall projecting parallel to the central axis of said cavity and concentric to said cavity, a winding carried by said support surrounding said cavity, a pair of cup-shaped magnetic members each having a base portion with a peripheral annular flange extending substantially perpendicular to said base portion, said cup-shaped members being individually mounted by said support at a separate one of said ends with the respective flanges seating against the inner side of the respective said annular wall, first and second magnetic elements each mounted by a separate one of said cup-shaped members within said cavity in the path of magnetic flux established by current flowing in said winding, each said element having an inner edge portion tapered laterally of said cavity, said inner edge portions being longitudinally spaced along said cavity to provide a varying length flux gap therebetween, a third magnetic element within said cavity and having portions located adjacent to but spaced from said laterally tapered edge portions, means mounting said third element for movement about an axis relative to said first and second elements in response to forces developed between said magnetic elements by said flux, and a tubular magnetic shield surrounding said support and said winding with the axis of the shield parallel to said axis of movement, said tubular shield having opposite end portions seating against the outer side of said annular walls in overlapping spaced relation to said annular flanges, said shield and said magnetic members forming flux paths for the flux established by said winding.

References Cited in the file of this patent

UNITED STATES PATENTS

| | | |
|---|---|---|
| 496,309 | Heinze | Apr. 25, 1893 |
| 2,183,566 | Hoare | Dec. 19, 1939 |
| 2,298,412 | Remde | Oct. 13, 1942 |
| 2,610,989 | Wiese | Sept. 16, 1952 |
| 2,844,801 | Sabaroff | July 22, 1958 |